Oct. 3, 1972    C. E. M. MORRIS    3,695,915
PROCESS FOR IMPROVING THE ADHESION OF POLYOLEFIN SURFACES
Filed June 23, 1970
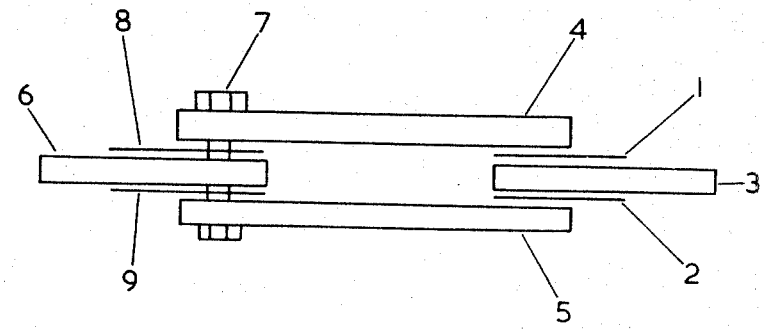
INVENTOR
CAROLYN ETHEL MARY MORRIS
BY
Cushman, Darby & Cushman
ATTORNEYS United States Patent Office 3,695,915
Patented Oct. 3, 1972

3,695,915
PROCESS FOR IMPROVING THE ADHESION OF POLYOLEFIN SURFACES
Carolyn Ethel Mary Morris, Runcorn, England, assignor to Imperial Chemical Industries Limited, London, England
Filed June 23, 1970, Ser. No. 49,116
Claims priority, application Great Britain, July 8, 1969, 34,417/69; Nov. 6, 1969, 54,430/69; Apr. 3, 1970, 15,962/70
Int. Cl. B44d 1/092, 1/24
U.S. Cl. 117—47 A                                    16 Claims

ABSTRACT OF THE DISCLOSURE

A process of modifying a polyolefin surface to improve the strength of the bond which may be obtained between it and another surface, which may or may not be a polyolefin, which comprises contacting said surface with an aqueous solution which contains peroxydisulphuric acid or a salt of said acid, preferably present in a concentration of between 1% and 25% by weight, and optionally, in the case where the polyolefin is polyethylene or poly(4-methyl pentene-1), in which the aqueous solution also contains at least one metal salt capable of activating peroxydisulphate oxidations.

---

This invention relates to a process of treating a polyolefin surface to improve the strength of the bond that may be obtained between it and another surface (including a polyolefin surface), e.g. to gain improved retention of print, paint coatings or metal coatings or to obtain laminates having a greater resistance to delamination.

It is known that it is very difficult, if not impossible, to obtain strong bonds between an untreated polyolefin surface and another surface, whether or not that other surface is also of polyolefin. It is also known that this poor adhesion which is characteristic of polyolefin surfaces may be improved, for example by subjecting the surface to flame treatment, electron bombardment, γ-irradiation, or a stream of an inert gas. Chemical methods of treatment which improve surface adhesion are also known; for example, a polyolefin surface may be treated with a solution of hydrogen peroxide and thereafter heated, or the surface may be treated with a solution of chromic acid.

Some of the known methods of treatment suffer from disadvantages, for example, it is known to improve the surface adhesion of polyolefins by prolonged treatment of a polyolefin surface with a solution of chromic acid. The treatment may need to be effected at high temperatures to obtain significant improvements in surface adhesion and may result in embrittlement and discolorruration of the surface. We now provide a process of treating a polyolefin surface which may, if desired, be operated at or near ambient temperature, which requires the provision of only inexpensive equipment is simple to operate, and which provides a substantial improvement in the bond strength which may be obtained between a polyolefin surface and another surface, which may or may not be a polyolefin.

According to the present invention we provide a process of modifying a polyolefin surface to improve the strength of the bond which may be obtained between it and another surface, which may or may not be a polyolefin, which comprises contacting said surface with an aqueous solution of peroxydisulphuric acid, or of a salt of said acid.

The solution of the acid or of the salt thereof is hereinafter referred to as the aqueous solution.

We have found that significant improvements in the strength of the bond that may be obtained between a polyolefin surface and another surface may be produced, particularly where the polyolefin is polyethylene, if the polyolefin surface is treated with an aqueous solution in which the concentration of peroxydisulphuric acid or salt thereof is 0.01% by weight or greater. Concentrations as low as 0.005% by weight may also be effective.

However, where it is desired to effect a substantial improvement in the strength of the bond which may be obtained between a polyolefin surface and another surface and it is desired to avoid the use of inconveniently long process times, particularly at temperatures at or near ambient, it is preferred to use at least a 0.5% by weight solution of peroxydisulphuric acid or salt thereof. Suitably the concentration of peroxydisulphuric acid or salt thereof in the aqueous solution may be between 1% and 20% or even 25% by weight, preferably between 1% and 12% by weight.

Any salt of peroxydisulphuric acid may be used provided it is sufficiently soluble in water. Suitable salts include the alkali metals salts, for example, the sodium salt. The ammonium salt is particularly suitable as it is readily soluble in water even at ambient temperatures.

Polyolefin surfaces which may be treated in the process of our invention may be formed from, for example, polypropylene, poly(butene-1), poly(4-methyl pentene-1) and both high and low density polyethylene. By polyolefin we also include copolymers of olefins with each other and with minor amounts e.g. up to 20 mole percent of other copolymerisable monomers.

The temperature at which the process may be effected may be at or near ambient temperature or, if desired, at elevated temperature, for example, between 40° C. and 80° C. or at even higher temperatures. Where the polyolefin surface is polyethylene or poly(4-methyl pentene-1) it is preferred to use a temperature of 30° C. or greater, and where the polyolefin is polypropylene a temperature of 50° C. or greater.

In general, to obtain a given increase in the strength of the bond which may be obtained between a polyolefin surface and another surface the time for which the polyolefin surface must be contacted with an aqueous solution of fixed concentration decreases with increase in the temperature of the solution and, at a fixed temperature, decreases with increase of the concentration of the acid or of the salt thereof in the aqueous solution. Suitable conditions to be used in the treatment of a polyolefin surface may be determined by means of simple experiment and by reference to the following description and to the examples at the end of this specification.

For example, we have found that where the polyolefin is polyethylene and the process is effected at a temperature of from 50° C. to 70° C. in an aqueous solution containing from 4% to 8% by weight of peroxydisulphuric acid or salt thereof significant improvements in the strength of the bond which may be obtained between a polyolefin surface and another surface may be produced with treatment times as short as 2 minutes or less. Where the temperature of treatment is lower, for example, near 30° C., longer treatment times may be more suitable. Suitably the polyolefin surface may be contacted with the aqueous solution for a period of from 5 minutes to 60 minutes, especially where substantial improvements are desired.

With certain polyolefins, especially polyethylene or poly(4-methylpentene-1) the process may be accelerated by the additional presence in the aqueous solution of at least one metal salt capable of activating peroxydisulphate oxidations, for example, copper, ferrous or silver salts. Suitable salts include silver sulphate, silver nitrate and copper sulphate. Suitable metal salts are those which are known to activate peroxydisulphate oxidations and may be selected by reference to the literature or by means of simple experiments. Decomposition of peroxydisulphuric acid or salts thereof result in the evolution of oxygen and suitable metal salts for use in the process of our invention are those which on addition to an aqueous solution of peroxydisulphuric acid or salt thereof result in an increase in the rate of evolution of oxygen.

A useful accelerating effect may be obtained when the metal salt, especially a silver salt, is present in the aqueous solution in a concentration of at least 0.01% by weight of the peroxydisulphuric acid or salt thereof. Where a greater degree of acceleration of the process is desired the concentration of metal salt preferably lies in the range 0.1% to 5% by weight, more preferably 1% to 5% by weights of the peroxydisulphuric acid or salt thereof in the aqueous solution. The metal salt must, of course, be sufficiently soluble in the aqueous solution to achieve the desired concentration.

Although the process may be applied to any shaped article having a polyolefin surface or surfaces it is particularly adapted to improving the adhesion of polyolefin sheets, films and fibres.

Contact between the polyolefin surface and the aqueous solution may conveniently be effected by dipping or immersing the article having such a surface in the solution. Where an article, for example, a sheet, film or fibre of polyolefin, is produced by extrusion it is often quenched by plunging it into water. In effecting the process of our invention the water quench may conveniently be replaced by a quench in the aqueous solution.

After the polyolefin surface has been contacted with the aqueous solution the surface is preferably washed to remove excess solution from the surface, for example, by washing in water which may suitably be distilled or deionised, or in an alkaline solution followed by washing in water.

The process of our invention may be adapted to continuous operation. For example, an extruded article of polyolefin may be passed continuously through a bath containing the aqueous solution and thereafter, if desired, washed to remove excess aqueous solution from the article. Where the process is operated continuously it may be desirable to maintain the concentration of the peroxydisulphuric acid or salt thereof in the aqueous solution in the bath and also to avoid the formation in the aqueous solution of unduly high concentrations of sulphuric acid which will be formed by decomposition of the peroxydisulphuric acid or salt thereof. This may be achieved, for example, by adding continuously or periodically a freshly prepared aqueous solution of peroxydisulphuric acid or salt thereof to the bath and continuously or periodically removing from the bath the exhausted solution. Alternatively, the aqueous solution which has been used in the process may periodically be replaced completely by a freshly prepared aqueous solution.

The improvement observed to be obtained by the process of our invention may change with the elapse of time between the treatment and the bonding of the surface to another surface. Where the treatment is vigourous, for example, where the polyolefin surface is treated for a long time at high temperature such that considerable improvements in strength are observed in bonds formed immediately after the treatment, the observed improvement may be less if there is a delay between treatment and bonding although the bond strength will still be greater than that obtained with an untreated surface. On the other hand, where the treatment is mild, for example, where the polyolefin surface is heated for a short time at a low temperature, such that the observed improvement in strength is moderate in bonds formed immediately after treatments, delay between treatment and bonding may result in higher, and often considerably higher bond strengths being obtained.

However, it is unnecessary that polyolefin surfaces treated by the process of our invention should be bonded to another surface immediately after treatment. The polyolefin surfaces which have been thus treated may be stored for a period of weeks, or even months, before bonding to another surface, and the resultant bonds which are the obtained will still be stronger than bonds obtained with untreated polyolefin surfaces.

The treatment of polyolefin articles by the process of our invention increases their utility, in particular in applications requiring printing, coating or laminating opera- tons to be performed on them. For example, printing of legends on polyolefin articles such as films, bags, sacks, sachets, tubes and bottles may be improved. The adhesion of paint coatings applied by normal painting techniques may be improved where the polyolefin articles has been treated by the process of our invention. In particular, greater bond strengths may be obtained between polyolefin sheets or films and sheets or films of polyolefin or other materials, for example, other polymeric materials, or, for example, metals, e.g. aluminum, or primer coatings or base coat lacquers applied to the polyolefins prior to metallising with, e.g. aluminum.

Polyolefins, particularly poly(4-methyl pentene-1), treated by the process of our invention and then treated with a base coat lacquer form strong bonds to metal coatings deposited therein, for example, by vacuum metallising, e.g. with aluminum. We have found that strongly bonded metal, e.g. aluminum coatings may be obtained if poly(4-methyl pentene-1) is treated with an aqueous solution of ammonium peroxydisulphate having a concentration of approximately 20% by weight at a temperature of from 50° C. to 80° C. for periods in excess of 10 minutes, the higher the temperature the shorter the treatment time required. A marked accelerating effect is obtained by the presence of metal salts in the aqueous solution for example, silver salts, e.g. silver sulphate. Suitably poly(methyl pentene-1) may be treated at a temperature as low as 30° C. for a time as short as 10 minutes in an aqueous solution containing approximately 6% by weight of ammonium peroxysulphate and 1% by weight of silver sulphate based on the ammonium peroxydisulphate.

Polyolefin surfaces which have been treated by the process of our invention and thereafter bonded to metals, for example, metal sheets, e.g. aluminum, by epoxy adhesives provide laminates wherein the bond strength may approach the cohesive strength of the polyolefin itself, or even in some cases exceed the cohesive strength, in which case failure of the bond occurs in the adhesive and/or in the polyolefin and not at the interface between the adhesive and the polyolefin. Articles having polyolefin surfaces treated by the process of this invention are useful in structural applications.

The process of our invention may be used to improve the strengths of bonds which may be obtained between the surface of a fibre-reinforced polyolefin shaped article and another surface. The fibre reinforcement may be carbon fibre, asbestos fibre, glass fibre, or a fibre of an organic polymeric material, for example, nylon, or a polyester e.g. poly(ethylene terephthalate).

The invention is illustrated by the following examples.

The apparatus used in the treatment of the polyolefin surfaces comprised a first tank containing a thermometer and a glass framework having rods for supporting articles, positioned within a second tank containing water, a heater, a thermostat and a stirrer.

The first tank was changed with water which was then heated to the desired temperature and maintained at that temperature by thermostatically controlling the temperature of the water in the second tank. An amount of peroxydisulphuric acid, or of a salt thereof, sufficient to give a solution of the desired concentration was dissolved in water in the first tank.

Samples of polyolefin films used in Examples 1 to 17 of dimensions $5/1000$ x 6 x 3 inches having holes near the 3 inch edges were threaded over the glass rods of the framework and the framework was placed in the first tank with the polyolefin films in a vertical position, the films being held below the surface of the aqueous solution. The samples of film were held apart by small glass spacers.

After the films had been treated for the desired length of time they were removed from the tank, washed with distilled water and suspended under slight tension over silica gel for 16 hours to dry.

The strengths of the bonds which could be formed between aluminium plates and the polyolefin films treated as described in Examples 1 to 17 was determined following the procedure hereinafter described reference being made to the drawing which is a schematic illustration of apparatus used in determining the bond strength.

Each polyolefin film was then cut into strips of dimensions 5/1000 x 1½ x 1¼ inches and two such strips were bonded to aluminum plates of dimensions 4 x 1 x ⅛ inch with an epoxy adhesive (Araldite AV100/HV100) to form double lap joints having a ½ inch overlap. The double lap joints are illustrated in the drawing accompanying the provisional specification and comprise two polyolefin strips (1, 2) bonded to aluminium plates 3, 4, 5 such that there is a ½ inch overlap between the plate 3 and the plates 4, 5. A further aluminium plate 6 is positioned between the plates 4, 5, fixed thereto by means of a bolt 7 and spaced therefrom by means of poly(ethylene terephthalate) film spacers 8, 9 of approximately the same thickness (5/1000 inch) as the thickness of the polyolefin strips and the adhesive by which the polyolefin strips are bonded to the aluminium plates.

The joints were clamped together and the adhesive was cured by heating the joints in an oven for 3 hours at 60° C.

Twenty such double lap joints were made in each case and subjected to a tensile shear test on a Hounsfield Horizontal Tensometer at a withdrawal rate of ¼ inch per minute. The ultimate shear strength of each joint was measured and the values obtained were averaged.

EXAMPLE 1

Films of additive-free high density polyethylene (Rumianca) were immersed for 60 minutes in a 0.25 molar aqueous solution of ammonium peroxydisulphate (equivalent to 5.7% by weight) at 50° C.

The ultimate strength of the double lap shear joints made with the thus treated films was 4200 lb./sq. in.

In a further experiment films of additive-free high density polyethylene (Rumianca) were immersed for only 20 minutes in a 0.25 molar aqueous solution of ammonium peroxydisulphate, the solution containing 0.0025 molar silver sulphate (equivalent to 1.37% by weight of the ammonium peroxydisulphate). The temperature of the solution was 50° C.

The ultimate shear strengths of the double lap joints made with the thus treated films was 4115 lb./sq. in.

By way of comparison the ultimate strength of double lap shear joints made with untreated polyethylene film (Rumianca) was only 150 lb./sq. in.

EXAMPLE 2

Films of additive-free high density poly(ethylene) (Rumianca) were immersed for various periods of time in a 0.25 molar aqueous solution of ammonium peroxydisulphate at 70° C.

The ultimate shear strengths of the double lap joints made with the thus treated films are shown in Table 1.

TABLE 1

| Sample | Time of immersion, min. | Ultimate shear strength, lb./sq. in. |
|---|---|---|
| A | 2 | 1,190 |
| B | 5 | 3,170 |
| C | 20 | 4,820 |
| D | 60 | 4,850 |

In a further experiment the procedure followed in treating Sample D above was repeated except that high density polyethylene film (Rigidex 50) was used. The ultimate shear strength of the double lap joints made with the thus treated film was 5400 lb./sq. in.

By way of comparison the ultimate shear strength of the double lap joints made with untreated polyethylene film (Rigidex 50) was only 180 lb./sq. in.

EXAMPLE 3

Films of additive-free high density polyethylene (Rumianca) were immersed in a 0.25 molar aqueous solution of ammonium peroxy-disulphate for 60 minutes at 70° C.

One day after the films had been treated in the aqueous solution double lap joints were made and tested. The ultimate shear strength of the joints was 4850 lb./sq. in.

The above procedure was repeated except that the double lap joints were made and tested 11 days after the films had been treated. The ultimate shear strength of the joints was 4900 lb./sq. in.

Double lap joints which were made and tested 43 days after the films had been treated had ultimate shear strengths of 4220 lb./sq. in.

In three further experiments the above procedure was repeated with films of high density polyethylene (Ridgidex 50) and the double lap joints were made and tested one day, eleven days and eighty-two days after the films had been treated in the aqueous solution. The ultimate shear strengths of the joints were respectively 5400 lb./sq. in., 4560 lb./sq. in. and 4200 lb./sq. in.

EXAMPLE 4

Films of additive-free high density polyethylene (Rumianca) were immersed in a 0.25 molar aqueous solution of ammonium peroxy-disulphate for respectively 5 minutes at 50° C., 2 minutes at 70° C. and 5 minutes at 70° C.

After the elapse of various periods of time after the films had been treated in the aquous solution double lap joints were made and tested. The ultimate shear strengths of the joints are given in Table 2.

TABLE 2

| | Time of immersion, minutes | Time elapsed after treatment, days | Ultimate shear strength, lb./sq. in. |
|---|---|---|---|
| Temperature of aqueous solution, ° C.: | | | |
| 50 | 5 | 1 | 700 |
| 50 | 5 | 56 | 1,000 |
| 70 | 2 | 1 | 1,190 |
| 70 | 2 | 34 | 3,260 |
| 70 | 5 | 1 | 3,170 |
| 70 | 5 | 89 | 4,150 |

EXAMPLE 5

Films of unstabilised poly(propylene) (supplied by Imperial Chemical Industries Limited) were immersed for 60 minutes in a 0.25 molar aqueous solution of ammonium peroxydisulphate at 70° C. The ultimate shear strengths of the double lap joints made with the thus treated films was 3220 lb./sq. in.

By way of comparison the ultimate shear strength of double lap joints made with the untreated film was only 210 lb./sq. in.

EXAMPLE 6

Films of high density polyethylene (Rigidex 50) were immersed for 20 minutes in a 0.26 molar aqueous solution of ammonium peroxydisulphate (equivalent to 5.93% by weight) at 30° C.

The ultimate shear strength of the double lap joints made with the thus treated films was 1250 lb./sq. in.

In a further experiment the above procedure was repeated except that the films were immersed for 20 minutes at 30° C. in a 0.26 molar aqueous solution of ammonium peroxydisulphate which also contained silver sulphate in a concentration of $2 \times 10^{-3}$ molar (equivalent to 1.05% by weight based on the ammonium peroxydisulphate in the solution). The ultimate shear strength of the double lap joints made with the thus treated films was 4860 lb./sq. in.

In two further experiments the above procedure was repeated except that the concentration of silver sulphate in the aqueous solution of ammonium peroxysulphate was reduced to $4 \times 10^{-4}$ molar (equivalent to 0.21% by weight based on the ammonium peroxydisulphate) and $8 \times 10^{-5}$ molar (equivalent to 0.042% by weight based on the ammonium peroxydisulphate) respectively.

The ultimate shear strength of the double lap joints made with the thus treated films was respectively 4680 lb./sq. in. and 2900 lb./sq. in.

EXAMPLE 7

Films of high density polyethylene (Rigidex 50) were immersed for 5 minutes in a 0.26 molar aqueous solution of ammonium peroxydisulphate at 70° C.

The ultimate shear strength of double lap joints made with the thus treated films was 4440 lb./sq. in.

In a further experiment the above procedure was repeated except that a $1 \times 10^{-3}$ molar aqueous solution of ammonium peroxydisulphate was used (equivalent to 0.023% by weight).

The ultimate shear strength of double lap joints made with the thus treated film was 2150 lb./sq. in.

EXAMPLE 8

The procedure of Example 7 was repeated except that a 0.26 molar aqueous solution of sodium peroxydisulphate was used (equivalent to 6.19% by weight).

The ultimate shear strength of double lap joints made with the thus treated films was 4230 lb./sq. in.

EXAMPLE 9

In order to illustrate the accelerating effect of a salt of a metal other than silver films of high density polyethylene (Rigidex 50) were immersed for 20 minutes at 30° C. in a 0.26 molar aqueous solution of ammonium peroxydisulphate which also contained copper sulphate in a concentration of $1 \times 10^{-2}$ molar (equivalent to 2.7% by weight based on the ammonium peroxydisulphate in the solution).

The ultimate shear strength of double lap joints made with the thus treated films was 2290 lb./sq. in.

EXAMPLE 10

Films of additive-free high density polyethylene film (Rumianca) were immersed in a 0.26 molar aqueous solution of ammonium peroxydisulphate for respectively 7 minutes and 20 minutes at 70° C., and 60 minutes at respectively 50° C. and 30° C.

After the elapse of various periods of time after the films had been treated in the aqueous solution double lap joints were made and tested. The ultimate shear strengths of the joints are given in Table 3.

TABLE 3

| Temperature of aqueous solution, °C.: | Time of immersion, minutes | Time elapsed after treatment, days | Ultimate shear strength, lb./sq. in. |
| --- | --- | --- | --- |
| 70 | 7 | 1 | 3,300 |
| 70 | 7 | 27 | 3,917 |
| 70 | 20 | 1 | 4,820 |
| 70 | 20 | 35 | 4,600 |
| 70 | 20 | 67 | 4,690 |
| 70 | 20 | 97 | 4,460 |
| 50 | 60 | 1 | 4,190 |
| 50 | 60 | 42 | 3,590 |
| 50 | 60 | 68 | 3,780 |
| 50 | 60 | 106 | 3,500 |
| 30 | 60 | 1 | 2,120 |
| 30 | 60 | 19 | 1,530 |
| 30 | 60 | 50 | 1,896 |
| 30 | 60 | 99 | 1,675 |

EXAMPLE 11

Films of additive-free high density polyethylene (Rumianca) were immersed for 5 minutes in aqueous solutions of ammonium peroxydisulphate of concentrations respectively 1%, 3%, 6% and 12% by weight at a temperature of 70° C.

After the elapse of various periods of time after the films had been treated in the aqueous solutions double lap joints were made and tested. The ultimate shear strengths of the joints are given in Table 4.

TABLE 4

| Concentration of ammonium peroxydisulphate in aqueous solution, percent by weight | Time elapsed after treatment, days | Ultimate shear strength, lb./sq. in. |
| --- | --- | --- |
| 1 | 1 | 2,134 |
| 1 | 31 | 1,930 |
| 1 | 79 | 2,123 |
| 3 | 1 | 2,290 |
| 3 | 36 | 2,330 |
| 3 | 84 | 2,340 |
| 6 | 1 | 3,170 |
| 6 | 29 | 4,125 |
| 6 | 56 | 3,600 |
| 6 | 89 | 4,150 |
| 12 | 1 | 4,280 |
| 12 | 35 | 4,000 |
| 12 | 112 | 3,937 |

EXAMPLE 12

Films of high density polyethylene (Rigidex 50) were immersed in a 0.26 molar aqueous solution of ammonium peroxydisulphate at a temperature of 70° C. for respectively 2 minutes, 5 minutes and 20 minutes.

After the elapse of various periods of time after the films had been treated in the aqueous solution double lap joints were made and tested. The ultimate shear strengths of the joints are given in Table 5.

TABLE 5

| Time of immersion in aqueous solution, minutes | Time elapsed after treatment, days | Ultimate shear strength, lb./sq. in. |
| --- | --- | --- |
| 2 | 1 | 3,148 |
| 2 | 54 | 3,283 |
| 2 | 92 | 3,406 |
| 5 | 1 | 4,440 |
| 5 | 29 | 4,322 |
| 5 | 60 | 4,250 |
| 20 | 1 | 4,560 |
| 20 | 22 | 4,573 |
| 20 | 114 | 4,406 |
| 20 | 154 | 4,452 |

EXAMPLE 13

Films of high density polyethylene (Rigidex 50) were immersed in a 0.26 molar aqueous solution of ammonium peroxydisulphate at a temperature of 30° C. for times of respectively 5 minutes, 20 minutes and 60 minutes.

After the elapse of various periods of time after the films had been treated in the aqueous solution double lap joints were made and tested and the ultimate shear strengths of the joints are given in Table 6.

In further experiments the above procedure was repeated except that the solution contained respectively $1 \times 10^{-2}$ molar copper sulphate (equivalent to 2.7% by weight based on the ammonium peroxydisulphate) and $2 \times 10^{-3}$ molar silver sulphate (equivalent to 1.05% by weight based on the ammonium peroxydisulphate).

The results are given in Table 6.

TABLE 6

| Time of immersion, minutes | Metal salt | Concentration of metal salt [1] | Time elapsed after treatment, days | Ultimate shear strength, lb./sq.in. |
|---|---|---|---|---|
| 5 | | | 1 | 925 |
| 5 | | | 27 | 1,010 |
| 5 | | | 105 | 840 |
| 20 | | | 1 | 1,250 |
| 20 | | | 35 | 1,390 |
| 20 | | | 73 | 1,525 |
| 20 | | | 109 | 1,055 |
| 60 | | | 1 | 1,180 |
| 60 | | | 36 | 1,120 |
| 60 | | | 77 | 905 |
| 20 | $CuSO_4$ | 2.7 | 1 | 2,290 |
| 20 | $CuSO_4$ | 2.7 | 38 | 1,885 |
| 60 | $CuSO_4$ | 2.7 | 1 | 2,720 |
| 60 | $CuSO_4$ | 2.7 | 36 | 2,090 |
| 5 | $Ag_2SO_4$ | 1.05 | 1 | 3,420 |
| 5 | $Ag_2SO_4$ | 1.05 | 39 | 4,010 |
| 20 | $Ag_2SO_4$ | 1.05 | 1 | 4,860 |
| 20 | $Ag_2SO_4$ | 1.05 | 43 | 5,030 |
| 60 | $Ag_2SO_4$ | 1.05 | 1 | 5,230 |
| 60 | $Ag_2SO_4$ | 1.05 | 37 | 4,315 |

[1] Percent by weight based on ammonium peroxydisulphate.

EXAMPLE 14

Films of unstabilised poly(propylene) (supplied by Imperial Chemical Industries Limited) were immersed in a 0.26 M aqueous solution of ammonium peroxydisulphate for various periods of time at various temperatures as indicated in Table 7. The ultimate shear strength of the joints are indicated in Table 7.

TABLE 7

| Temperature of aqueous solution, °C. | Time of immersion, minutes | Ultimate shear strength, lb./sq. in. |
|---|---|---|
| 20 | 60 | 290 |
| 30 | 60 | 350 |
| 40 | 60 | 970 |
| 80 | 25 | 2,610 |
| 90 | 10 | 3,510 |

EXAMPLE 15

Films of unstabilised poly(propylene) (supplied by Imperial Chemical Industries Limited) were immersed in a 0.26 M aqueous solution of ammonium peroxydisulphate at a temperature of 70° C. for the periods of time indicated in Table 8. The ultimate shear strength of the joints are indicated in Table 8.

TABLE 8

| Temperature of aqueous solution, °C. | Time of immersion, minutes | Ultimate shear strength, lb./sq. in. |
|---|---|---|
| 70 | 5 | 760 |
| 70 | 20 | 1,160 |
| 70 | 60 | 3,220 |
| 70 | 90 | 3,030 |
| 70 | 120 | 3,470 |

EXAMPLE 16

The procedure of the first three experiments described in Example 15 was repeated and after the elapse of various periods of time after the films had been treated in the aqueous solution double lap joints were made and tested and the ultimate shear strengths of the double lap joints are given in Table 9.

TABLE 9

| Time of immersion, minutes | Days after treatment | Ultimate shear strength lb./sq. in. |
|---|---|---|
| 5 | 1 | 760 |
| 5 | 28 | 680 |
| 5 | 67 | 620 |
| 5 | 102 | 820 |
| 20 | 1 | 1,160 |
| 20 | 50 | 1,280 |
| 20 | 88 | 1,250 |
| 60 | 1 | 3,220 |
| 60 | 40 | 2,695 |
| 60 | 109 | 3,505 |
| 60 | 151 | 2,930 |

EXAMPLE 17

Films of high density polyethylene (Rigidex 50) were immersed for 30 seconds in 0.26 molar aqueous solutions of ammonium peroxydisulphate, the solutions containing $2 \times 10^{-3}$ molar silver sulphate (equivalent to 1.05% by weight based on the ammonium peroxydisulphate), the temperatures of the solutions being respectively 50° C., 60° C. and 70° C.

Double lap joints made from films treated as described above had ultimate shear strengths of respectively 1825 lb./sq. in., 1260 lb./sq. in. and 1610 lb./sq. in.

EXAMPLE 18

Injection moulded samples of high density polyethylene (Rigidex 50) having dimensions 4 inch x 1 inch x ⅛ inch were immersed for 20 minutes in a 0.26 molar aqueous solution of ammonium peroxydisulphate containing $2 \times 10^{-3}$ molar silver sulphate at a temperature of 30° C. Four such samples were bonded together with the epoxy adhesive used in Example 1 to form a double lap joint having a ½ inch overlap. The average ultimate shear strength of 10 such joints was 415 lb./sq. in.

In a further experiment the above procedure was repeated except that the samples were immersed in the aqueous solution for 60 minutes. The ultimate shear strengths of the joints was 570 lb./sq. in.

By way of comparison the ultimate shear strength of joints made with untreated polyethylene samples (Rigidex 50) was only 58 lb./sq. in.

EXAMPLE 19

The procedure of Example 18 was followed using samples of unstabilised poly(propylene) (supplied by Imperial Chemical Industries Limited) and an aqueous solution of 0.26 molar ammonium peroxydisulphate at a temperature of 70° C. The samples were immersed for 60 minutes. The ultimate shear strength of the double lap joints was 260 lb./sq. in.

By way of comparison the ultimate shear strength of joints made with untreated poly(propylene) was only 38 lb./sq. in.

EXAMPLE 20

Separate tiles of poly(4-methyl pentene-1) (TPX grade RT-18 Imperial Chemical Industries Limited) having dimensions 2½ x 3½ x ⅛ inches were immersed in a 1.0 molar aqueous solution of ammonium peroxydisulphate (equivalent to 22.8% by weight) at 70° C. for periods of 5, 10, 20 and 30 minutes. The tiles were then washed with deionised water and allowed to dry.

Each of the tiles was then immersed for a few seconds in a bath of vacuum-metallising base-coat lacquer (EV 6174 thinned 20% with xylene, Bee Chemicals Limited) and the coatings applied to the tiles were allowed to air dry. The tiles were then stoved in an oven for 1 hour at a temperature of 140° C. and then removed from the oven and allowed to cool to room temperature.

The tiles were then placed in the vacuum chamber of a Speedivac vacuum-coating unit (Model No. 12E3/1337, Edwards High Vacuum Limited) and a 1 inch long 20 SWG aluminium wire was fitted into the tungsten filament of the unit. The unit was then sealed and evacuated to a pressure of $0.1 \times 10^{-3}$ mm. of mercury and the aluminum wire fired by passing a 45 amp current through the tungsten filament for a few seconds. Air was then admitted to the unit and the metal-coated tiles removed.

The adhesion of the metal coating on the tiles was then tested as follows. The results are shown in Table 10.

A strip of adhesive tape (Scotch tape) was pressed firmly onto the metal coating and removed with a rapid snatching action. If the metal coating was not removed from the tile the tile is indicated as having passed the straight tape test. If the metal coating was removed from the tile the tile is indicated as having failed the straight tape test.

In a further test a 1 inch square area of the metal coating was marked with a series of razor cuts longitudinally and transversely, the cuts being 1/16 inch apart. Adhesive tape was pressed firmly over the thus cross-hatched area and removed with a rapid snatching action. If the metal coating was not removed the tile is indicated as having passed the cross-hatch tape test. If the metal coating was removed the tile is indicated as having failed the cross-hatch tape test.

TABLE 10

| Temperature of aqueous solution, °C. | Time of immersion, minutes | Straight tape test | Cross-hatch tape test |
|---|---|---|---|
| 70 | 5 | Passed | Failed. |
| 70 | 10 | do | Passed. |
| 70 | 20 | do | Do. |
| 70 | 3 | do | Do. |

In a further series of experiments the above procedure was repeated except that the temperature of the aqueous solution of ammonium peroxydisulphate was 50° C. The results are given in Table 11.

TABLE 11

| Temperature of aqueous solution, °C. | Time of immersion minutes | Straight tape test | Cross-hatch tape test |
|---|---|---|---|
| 50 | 5 | Passed | Failed. |
| 50 | 10 | do | Do. |
| 50 | 20 | do | Passed. |
| 50 | 30 | do | Do. |

EXAMPLE 21

The procedure of Example 20 was followed using tiles of poly(4-methyl pentene-1) except that the temperature of the aqueous solution of ammonium peroxydisulphate was 30° C. The results are given in Table 12.

TABLE 12

| Temperature of aqueous solution, °C. | Concentration of ammonium peroxydisulphate, percent by weight | Time of immersion, minutes | Straight tape test | Cross-hatch tape test |
|---|---|---|---|---|
| 30 | 22.8 | 5 | Failed | Failed. |
| 30 | 22.8 | 10 | do | Do. |
| 30 | 22.8 | 20 | do | Do. |
| 30 | 22.8 | 30 | do | Do. |

In order to show the accelerating effect of the presence of a metal salt in the aqueous solution the above procedure was followed except that the concentration of ammonium peroxydisulphate was reduced to 0.5 molar (equivalent to 11.4% by weight) and silver sulphate at a concentration of 0.002 molar (equivalent to 0.55% by weight based on the ammonium peroxydisulphate) was dissolved in the solution. The results are given in Table 13.

TABLE 13

| Temperature of aqueous solution, °C. | Concentration of ammonium peroxydisulphate, percent by weight | Concentration of silver sulphate, percent by weight based on ammonium peroxydisulphate | Time of immersion, minutes | Straight tape test | Cross-hatch tape test |
|---|---|---|---|---|---|
| 30 | 11.4 | 0.55 | 10 | Passed | Passed. |
| 30 | 11.4 | 0.55 | 30 | do | Do. |
| 30 | 11.4 | 0.55 | 60 | do | Do. |

In a further series of experiments the above procedure was repeated except that the concentration of ammonium peroxydisulphate was reduced to 0.25 molar (equivalent to 5.7% by weight), the concentration of silver sulphate being maintained at 0.002 molar (equivalent to 1.10% by weight based on the ammonium peroxydisulphate). The results are given in Table 14.

TABLE 14

| Temperature of aqueous solution, °C. | Concentration of ammonium peroxydisulphate, percent by weight | Concentration of silver sulphate, percent by weight based on ammonium peroxydisulphate | Time of immersion, minutes | Straight tape test | Cross-hatch tape test |
|---|---|---|---|---|---|
| 30 | 5.7 | 1.10 | 10 | Passed | Passed. |
| 30 | 5.7 | 1.10 | 30 | do | Do. |
| 30 | 5.7 | 1.10 | 60 | do | Do. |

In a further series of experiments the above procedure was repeated except that the temperature of the aqueous solution was 70° C. The results are given in Table 15.

TABLE 15

| Temperature of aqueous solution, °C. | Concentration of ammonium peroxydisulphate, percent by weight | Concentration of silver sulphate, percent by weight based on ammonium peroxydisulphate | Time of immersion, minutes | Straight tape test | Cross-hatch tape test |
|---|---|---|---|---|---|
| 70 | 5.7 | 0.002 | 2 | Failed | Failed. |
| 70 | 5.7 | 0.002 | 5 | ...do... | Do. |
| 70 | 5.7 | 0.002 | 15 | Passed | Passed. |

EXAMPLE 22

In order to show the effect of variation of concentration of ammonium peroxydisulphate on the adhesion of the aluminium coating the procedure of Example 20 was followed, the tiles of poly(4-methyl pentene-1) being immersed for 20 minutes at 70° C. in solutions of various concentrations. The results are given in Table 16.

TABLE 16

| Concentration of ammonium peroxydisulphate, percent by weight | Temperature of aqueous solution, °C. | Time of immersion, minutes | Straight tape test | Cross-hatch tape test |
|---|---|---|---|---|
| 45.6 | 70 | 20 | Passed | Passed. |
| 22.8 | 70 | 20 | ...do... | Do. |
| 11.4 | 70 | 20 | ...do... | Do. |
| 5.7 | 70 | 20 | ...do... | Failed. |

What I claim is:

1. A process of modifying a polyolefin surface to improve the strength of the bond which may be obtained between it and another sruface which comprises contacting said surface with an aqueous solution of a solute, said solute being selected from the group consisting of peroxydisulfuric acid and salts of said acid in a concentration by weight of 0.01% to 25%.

2. A process as claimed in claim 1 in which the concentration of peroxydisulphuric acid or salt thereof in the aqueous solution is between 1% and 25% by weight.

3. A process as claimed in claim 1 in which the concentration of peroxydisulphuric acid or salt thereof in the aqueous solution is between 1% and 12% by weight.

4. A process as claimed in claim 1 in which the salt of peroxydisulphuric acid is an alkali metal salt.

5. A process as claimed in claim 4 in which the alkali metal is sodium.

6. A process as claimed in claim 1 in which the salt of peroxydisulphuric acid is an ammonium salt.

7. A process as claimed in claim 1 in which the polyolefin is selected from the group consisting of polyethylene, polypropylene and poly(4-methyl-pentene-1).

8. A process as claimed in claim 7 in which the polyolefin is selected from the group consisting of polyethylene and poly(4-methyl pentene-1) and which is treated at a temperature of 30° C. or greater.

9. A process as claimed in claim 7 in which the polyolefin is polypropylene and which is treated at a temperature of 50° C. or greater.

10. A process as claimed in claim 7 in which the polyolefin is selected from the group consisting of polyethylene and poly(4-methyl pentene-1) and in which the aqueous solution contains at least one metal salt capable of activating peroxydisulphate oxidation.

11. A process as claimed in claim 10 in which the metal salt is selected from the group consisting of copper and silver salts.

12. A process as claimed in claim 11 in which the silver salt is selected from the group consisting of silver sulphate and silver nitrate.

13. A process as claimed in claim 11 in which the copper salt is copper sulphate.

14. A process as claimed in claim 10 in which the metal salt is present in a concentration of at least 0.01% by weight of the peroxydisulphuric acid or salt thereof.

15. A process as claimed in claim 14 in which the metal salt is present in a concentration of between 0.1% and 5% by weight of the peroxydisulphuric acid or salt thereof.

16. A process as claimed in claim 15 in which the metal salt is present in a concentration of between 1% and 5% by weight of the peroxydisulphuric acid or salt thereof.

References Cited

UNITED STATES PATENTS

| 3,003,892 | 10/1961 | Shannon | 117—47 A |
| 3,142,581 | 7/1964 | Leland | 117—47 A |
| 3,286,009 | 11/1966 | Yumoto et al. | 117—47 A |
| 3,485,574 | 12/1969 | Miller et al | 8—115.5 |
| 3,235,426 | 2/1966 | Bruner | 117—47 A |
| 3,552,996 | 1/1971 | Cass | 117—47 A |
| 3,377,187 | 4/1968 | Donaldson | 117—47 A |
| 3,248,271 | 4/1966 | Reilly et al. | 117—47 A |
| 3,553,085 | 1/1971 | Heymann | 117—47 A |

OTHER REFERENCES

Cotton & Wilkinson, Advanced Inorganic Chemistry (1962), Interscience Publishers, pp. 283, 284, 423 to 426, 428 and 429.

WILLIAM D. MARTIN, Primary Examiner

M. SOFOCLEOUS, Assistant Examiner

U.S. Cl. X.R.

8—115.6; 117—118, 138.8 E; 156—2, 3, 308; 260—94.9 GD